United States Patent

Ngo et al.

[11] Patent Number: 5,964,827
[45] Date of Patent: Oct. 12, 1999

[54] HIGH-SPEED BINARY ADDER

[75] Inventors: Hung Cai Ngo; Sang Hoo Dhong, both of Austin, Tex.; Joel Abraham Silberman, Somers, N.Y.

[73] Assignee: International Business Machines Corporation, Armonk, N.Y.

[21] Appl. No.: 08/971,653

[22] Filed: Nov. 17, 1997

[51] Int. Cl.[6] .................................................. G06F 7/52
[52] U.S. Cl. ............................................................ 708/710
[58] Field of Search .......................... 364/787.01, 789.02, 364/787.03, 787.04; 708/710, 711, 712, 713

[56] References Cited

U.S. PATENT DOCUMENTS

| | | | |
|---|---|---|---|
| 3,805,045 | 4/1974 | Larsen | 364/787.01 |
| 4,228,520 | 10/1980 | Letteney et al. | |
| 4,858,168 | 8/1989 | Hwang | |
| 5,084,835 | 1/1992 | Okamoto | 364/787.01 |
| 5,136,539 | 8/1992 | Kumar | |
| 5,257,218 | 10/1993 | Poon | |
| 5,434,810 | 7/1995 | Goto et al. | |
| 5,500,813 | 3/1996 | Song et al. | |
| 5,508,952 | 4/1996 | Kantabutra | |
| 5,539,332 | 7/1996 | Schmookler | |
| 5,812,521 | 9/1998 | Levenstein et al. | 364/787.01 |

FOREIGN PATENT DOCUMENTS 1-050123  2/1989  Japan .

OTHER PUBLICATIONS

R.M. Wade, "Ripple Adder Carry Logic," IBM Technical Disclosure Bulletin, vol. 10, No. 11, Apr. 1968, pp. 1638–1639.

"Improved Zero Result Detection When Using a Carry Look–Ahead Adder," IBM Technical Disclosure Bulletin, vol. 30, No. 11, Apr. 1988, pp. 288–290.

A. Weinberger, "High–Speed Binary Adder," IBM Technical Disclosure Bulletin, vol. 11, No. 2, Jul. 1968, pp. 154–156.

*Primary Examiner*—David H. Malzahn
*Attorney, Agent, or Firm*—Casimer K. Salys; Antony P. Ng; Andrew J. Dillon

[57] ABSTRACT

A high-speed carry-lookahead binary adder is disclosed. The binary adder includes multiple rows of carry-lookahead circuits, a half-sum module, and a sum/carry module. A first carry-lookahead circuit row includes multiple four-bit group generate circuits and multiple four-bit group propagate circuits. Each of the four-bit group generate circuits produces a generate signal for a corresponding bit location. Each of the four-bit group propagate circuits produces a propagate signal for a corresponding bit location. The half-sum module is utilized to generate a half-sum signal. By utilizing the half-sum signal, the generate signals, and the propagate signals, the sum/carry module generates sum signals and a carry signal.

18 Claims, 6 Drawing Sheets

HIGH-SPEED BINARY ADDER

BACKGROUND OF THE INVENTION

1. Technical Field

The present invention relates to an apparatus for data processing in general, and in particular to a binary adder. Still more particularly, the present invention relates to a high-speed carry-lookahead binary adder.

2. Description of the Prior Art

Binary adders having a carry-lookahead are well known in the art. This type of binary adder is able to add two multiple-bit binary numbers while simultaneously computing a carry signal for each bit.

In order to compute the sum of two multiple-bit binary numbers A and B, a generate signal and a propagate signal are initially produced at each bit location. The equation for a generate signal $G(i)$ is: $G(i)=A(i)B(i)$, and the equation for a propagate signal $P(i)$ is: $P(i)=A(i)\overline{B(i)}+\overline{A(i)}B(i)$ or $A(i) \oplus B(i)$, where i denotes a bit location within the binary numbers and bit 0 is the most significant bit. These generate signals and propagate signals are then utilized to produce a carry signal for each bit. The generalized equation for a carry signal $C(i)$ is: $C(i)=G(i)+P(i)\ G(i+1)+P(i)\ P(i+1)\ G(i+2)+P(i)\ P(i+1)\ P(i+2)\ G(i+3)+\ldots$, etc.

Due to practical limitations such as fan-in, most carry-lookahead binary adders utilize several rows (or levels) of carry-lookahead circuits to produce carry signals while producing generate signals and propagate signals at each row. A row is commonly referred to a group or groups of circuits, the results of which are required by a subsequent row of circuits for further processing. For example, in a typical 64-bit carry-lookahead adder, groups of generate signals (G) and propagate signals (P) must first be produced in the first row for each bit. Then, a 4-bit group generate signal (G4) and a 4-bit group propagate signal (P4) are then produced at the second level for each group of four bits. The equation for a 4-bit group generate signal (G4) is: $G4(i)=G(i)+P(i)\ G(i+1)+P(i)\ P(i+1)\ G(i+2)+P(i)\ P(i+1)\ P(i+2)\ G(i+3)$; and the equation for a 4-bit group propagate signal (P4) is: $P4(i)=P(i)\ P(i+1)\ P(i+2)\ P(i+3)$.

Subsequently, a 16-bit group generate signal (G16) and a 16-bit group propagate signal (P16) are produced at the third level for each group of four 4-bit group generate signals (G4). The equation for a 16-bit group generate signal (G16) is: $G16(i)=G4(i)+P4(i)\ G4(i+4)+P4(i)\ P4(i+4)\ G4(i+8)+P4(i)\ P4(i+4)\ P4(i+8)\ G4(i+12)$; and the equation for a 16-bit group propagate signal (P16) is: $P16(i)=P4(i)\ P4(i+4)\ P4(i+8)\ P4(i+12)$.

The carry signal equations are then given as follows:

$C(56)=G4(56)+P4(56)\ G4(60)$;
$C(52)=G4(52)+P4(52)\ G4(56)+P4(52)\ P4(56)\ G4(60)$;
$C(48)=G16(48)=G4(48)+P4(48)\ G4(52)+P4(48)\ P4(52)\ G4(56)+P4(48)\ P4(52)\ P4(56)\ G4(60)$;
$C(32)=G16(32)+P16(32)\ G16(48)$;
$C(16)=G16(16)+P16(16)\ G16(32)+P16(16)\ P16(32)\ G16(48)$; and
$C(0)=C_{OUT}=G16(0)+P16(0)\ G16(16)+P16(0)\ P16(16)\ G16(32)+P16(0)\ P16(16)\ P16(32)\ G16(48)$.

As shown, a four-transistor stack is required within each carry-lookahead circuit to generate the last term of the carry equation, $P_iP_{i+1}P_{i+2}G_{i+3}$, and a three-transistor stack is required to generate the next-to-last term of the carry equation, $P_iP_{i+1}G_{i+2}$. Stacking transistors in this manner increases the delay and decreases the overall performance of the binary adder. Consequently, it would be desirable to provide an improved method for a binary adder to generate group propagate signals and group generate signals with minimal transistor-stacking such that the speed of the binary adder will be increased.

SUMMARY OF THE INVENTION

In view of the foregoing, it is therefore an object of the present invention to provide an improved apparatus for data processing.

It is another object of the present invention to provide an improved binary adder.

It is yet another object of the present invention to provide a high-speed carry-lookahead binary adder.

In accordance with a preferred embodiment of the present invention, a binary adder includes multiple rows of carry-lookahead circuits, a half-sum module, and a sum/carry module. A first carry-lookahead circuit row includes multiple four-bit group generate circuits and multiple four-bit group propagate circuits. Each of the four-bit group generate circuits produces a generate signal for a corresponding bit location. Each of the four-bit group propagate circuits produces a propagate signal for a corresponding bit location. The half-sum module is utilized to generate a half-sum signal. By utilizing the half-sum signal, the generate signals, and the propagate signals, the sum/carry module generates sum signals and a carry signal.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

A preferred embodiment of the present invention and its advantages are better understood by referring to FIGS. 1–6, like numerals being utilized for like and corresponding parts.

Figure 1:
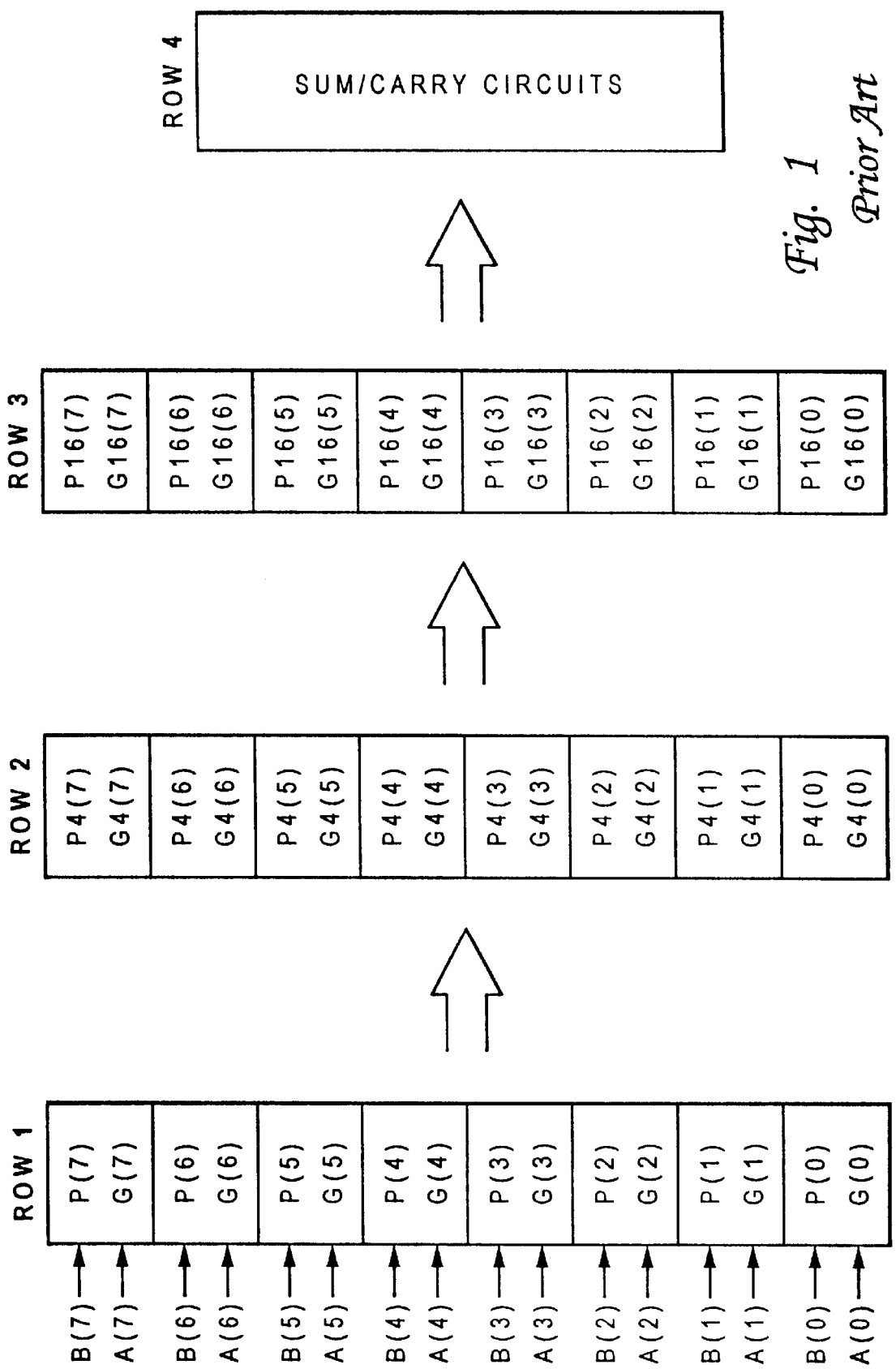
FIG. 1 is a pictorial representation of the generation of propagate signals and generate signals for bit locations 0–7, according to the prior art.

With reference now to the drawings, and specifically to FIG. 1, there is illustrated a pictorial representation of the generation of propagate signals and generate signals for bit locations 0–7, according to the prior art. As shown, propagate signals P(0)–P(7) and generate signals G(0)–G(7) are produced by carry-lookahead circuits in Row 1. These signals are then utilized by carry-lookahead circuits in Row 2 to produce group generate signal G4( ). Because there are eight-bit locations, eight group generate signals G4(0)–G4(7) are produced. The group generate signals G4( ) are subsequently utilized by carry-lookahead circuits in Row 3 to produce group generate signals G16( ). Finally, a set of sum/carry circuits in Row 4 is utilized to generate a sum signal. Hence, under this arrangement according to the prior art, a 64-bit binary adder may require up to four rows of circuits in order to produce a sum signal.

Figure 2:
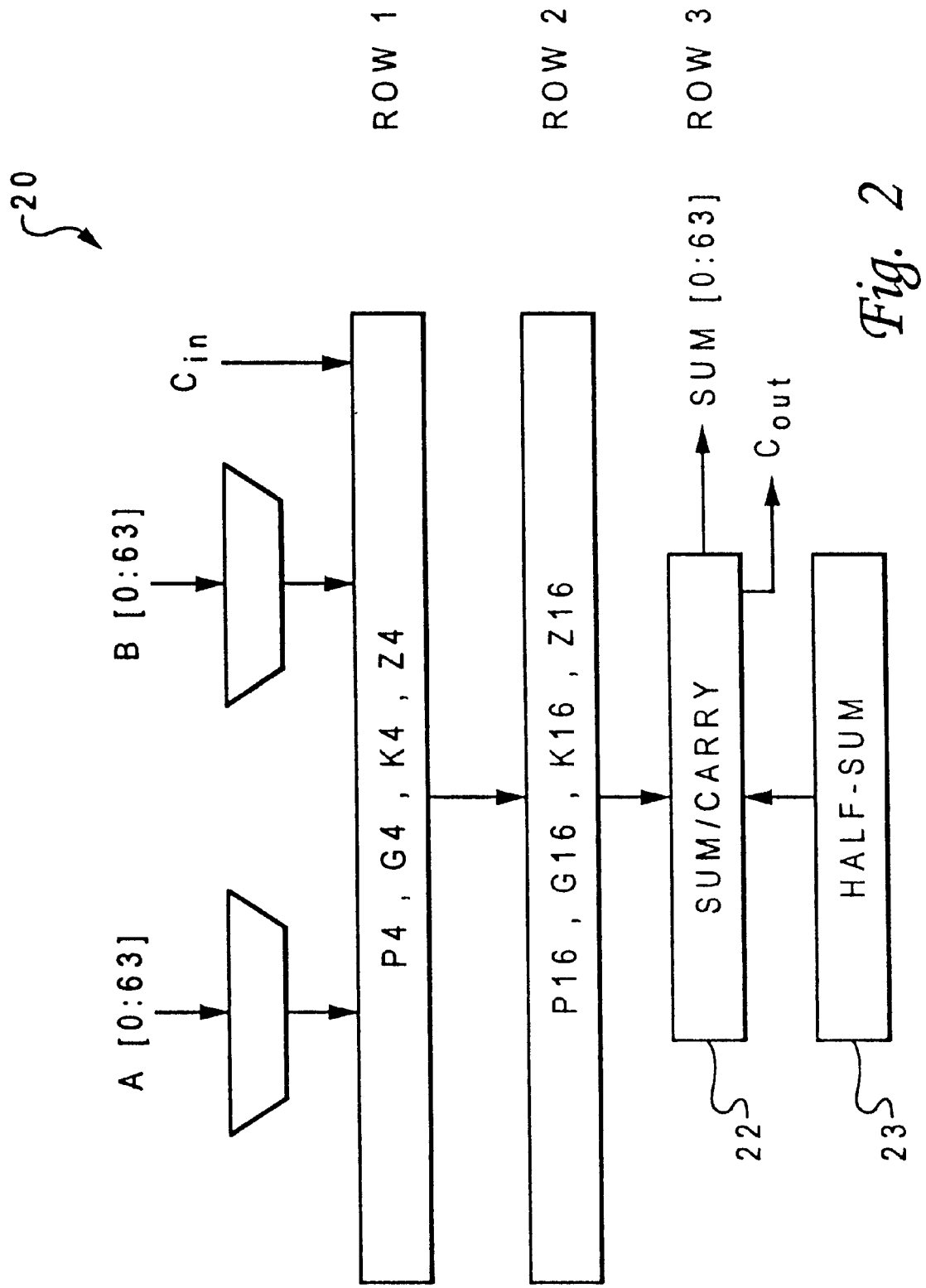
FIG. 2 is a binary adder in accordance with a preferred embodiment of the present invention.

With reference now to FIG. 2, there is depicted a binary adder 20 in accordance with a preferred embodiment of the present invention. Binary adder 20 receives a first binary number A, a second binary number B, and a carry-in signal $C_{in}$. For purposes of illustration, binary adder 20 is a 64-bit binary adder. Thus, binary number A includes bits A(0)–A(63) and binary number B includes bits B(0)–B(63), with bit 0 being the most significant bit and bit 63 being the least significant bit. Binary adder 20 includes only two levels of carry-lookahead circuits-Row 1 and Row 2. The carry-lookahead circuits in Row 1 are utilized to produce group generate signals G4( ) and group propagate signals P4( ). The carry-lookahead circuits in Row 2 are utilized to produce group generate signals G16( ) and group propagate signals P16( ). Half-sum module 23 is utilized to produce a half-sum signal. By combining the group signals from Row 2 with the half-sum signal generated by half-sum module 23, binary adder 20 outputs a sum signal SUM(0)–SUM(63) and a carry-out signal $C_{OUT}$ via a sum/carry module 22. Although a 64-bit adder is utilized to illustrate the present invention, it will be understood by those skilled in the art that similar circuitry and logic may be utilized for binary adders having a different number of bits.

In accordance with a preferred embodiment of the present invention, a propagate signal P(i) is defined as P(i) =A(i)+B(i) (instead of A(i)$\oplus$B(i) under the prior art), and a generate signal G(i) is defined as G(i)=A(i)B(i)=P(i)G(i). Note that G(i)=P(i)G(i)=[A(i)+B(i)][A(i)B(i)]=A(i)A(i)B(i)+A(i)B(i)B(i)=A(i)B(i)+A(i)B(i)=A(i)B(i). Accordingly, one of the group generate G4 signals in Row 1 of FIG. 2 can be written as:

$$G4(0) = G(0) + P(0)P(1)G(1) + P(0)P(1)G(2) + P(0)P(1)P(2)G(3)$$
$$= G(0) + P(0)P(1) [G(1) + G(2) + P(2)G(3)]$$
$$= [G(0) + P(0)P(1)] [G(0) + G(1) + G(2) + P(2)G(3)]$$

By applying the same underlying definitions to the generation of group propagate P4 signals, one of the group propagate P4 signals in Row 1 of FIG. 2 can be written as:

$$P4(0) = G(0) + P(0)P(1)G(1) + P(0)P(1)G(2) + P(0)P(1)P(2)G(3) +$$
$$P(0)P(1)P(2)P(3)$$
$$= [G(0) + P(0)P(1)] [G(0) + G(1) + G(2) + P(2)G(3) +$$
$$P(2)P(3)]$$
$$= [G(0) + P(0)P(1)] [G(0) + G(1) + G(2) + P(2)P(3)]$$

Now, since G4(i)=P4(i)G4(i), one of the group generate G16 signals in Row 2 FIG. 2 can be written as:
G16(0)=[G4(0)+P4(0)P4(4)] [G4(0)+G4(4)+G4(8)+P4(8)G4(12)]

and similarly, one of the group propagate P16 signals in Row 2 can be written as:

$$P16(0) = [G4(0) + P4(0)P4(4)] [G4(0) + G4(4) + G4(8) +$$
$$P4(8)G4(12) + P4(8)P4(12)]$$
$$= [G4(0) + P4(0)P4(4)] [G4(0) + G4(4) + G4(8) +$$
$$P4(8)P4(12)]$$

Furthermore, the complements of P(i) and G(i) are preferably defined as K(i) and Z(i), respectively. In other words, K(i)=$\overline{A(i)+B(i)}$ and Z(i)=$\overline{A(i)}$ $\overline{B(i)}$=$\overline{P(i)}$ $\overline{G(i)}$=K(i)Z(i). It is understood that K(i) and Z(i) may be generated in a similar fashion as P(i) and G(i) shown above.

The output of sum/carry module 22 is utilized to generate a carry out $C_{OUT}$. The equation for carry out $C_{OUT}$ is:

$C_{OUT}$=[G16(0)+P16(0)P16(16)] [G16(0)+G16(16)+G16(32)+P16(32)G16(48)]

In order to generate sum signals SUM(i), the group signals generated in Row 2 of FIG. 2 are utilized in conjunction with a half sum from half-sum module 23. Half-sum HS(i) may be combined with carry signal C(i) in sum/carry module 22 to produce a SUM(i) such that SUM(i)=HS(i) $\oplus$ C(i+1). For example, SUM(0)=HS(0)$\oplus$C(1), where HS(0) and C(1) are a half-sum of bit 0 and a carry of bit 1, respectively. The sum of bit 0, SUM(0), can also be expressed as: SUM(D)=HS(0) [Z16(1)+K16(1) K16(17)] [Z16(1)+Z16(17)+Z16(33)+K16(33) Z16(49)]+HS(0) [G16(1)+P16(1) P16(17)] [G16(1)+G16(17)+G16(33)+P16(33) G16(49)].

Figure 3:
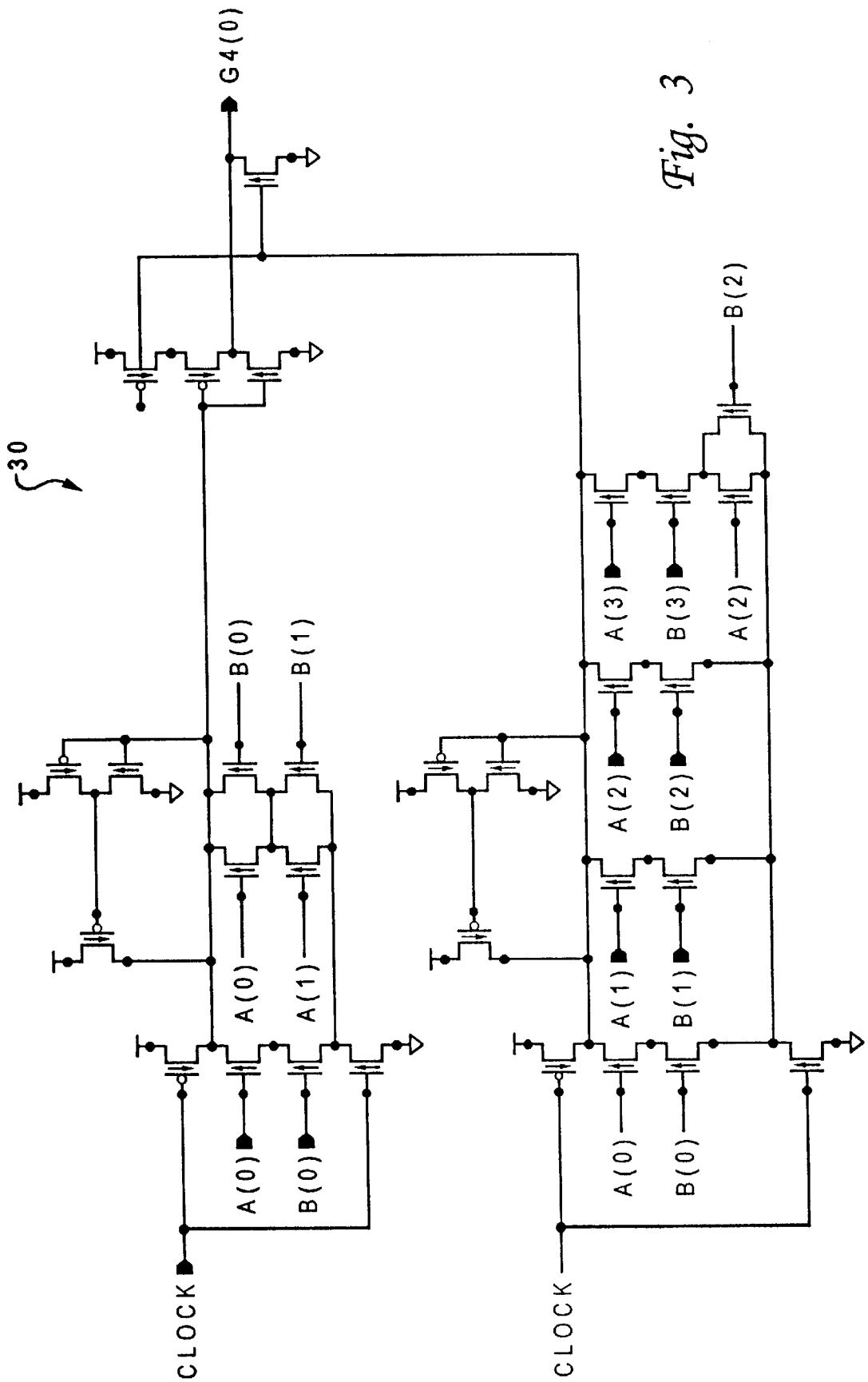
FIG. 3 is a schematic diagram of a circuit for generating a group generate signal G4(0), in accordance with a preferred embodiment of the present invention.
Figure 4:
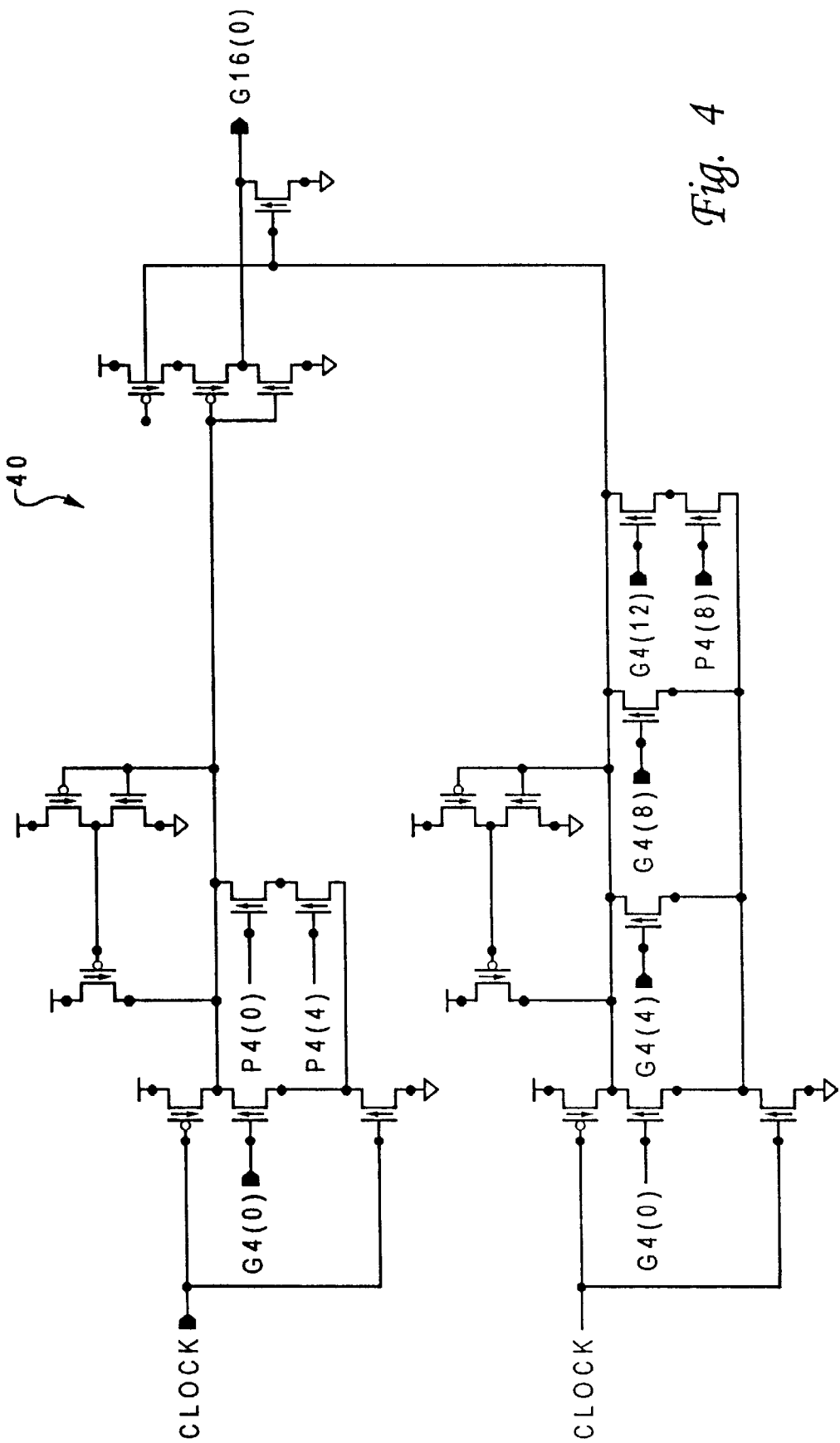
FIG. 4 is a schematic diagram of a circuit for generating a group generate signal G16(0), in accordance with a preferred embodiment of the present invention.
Figure 5:
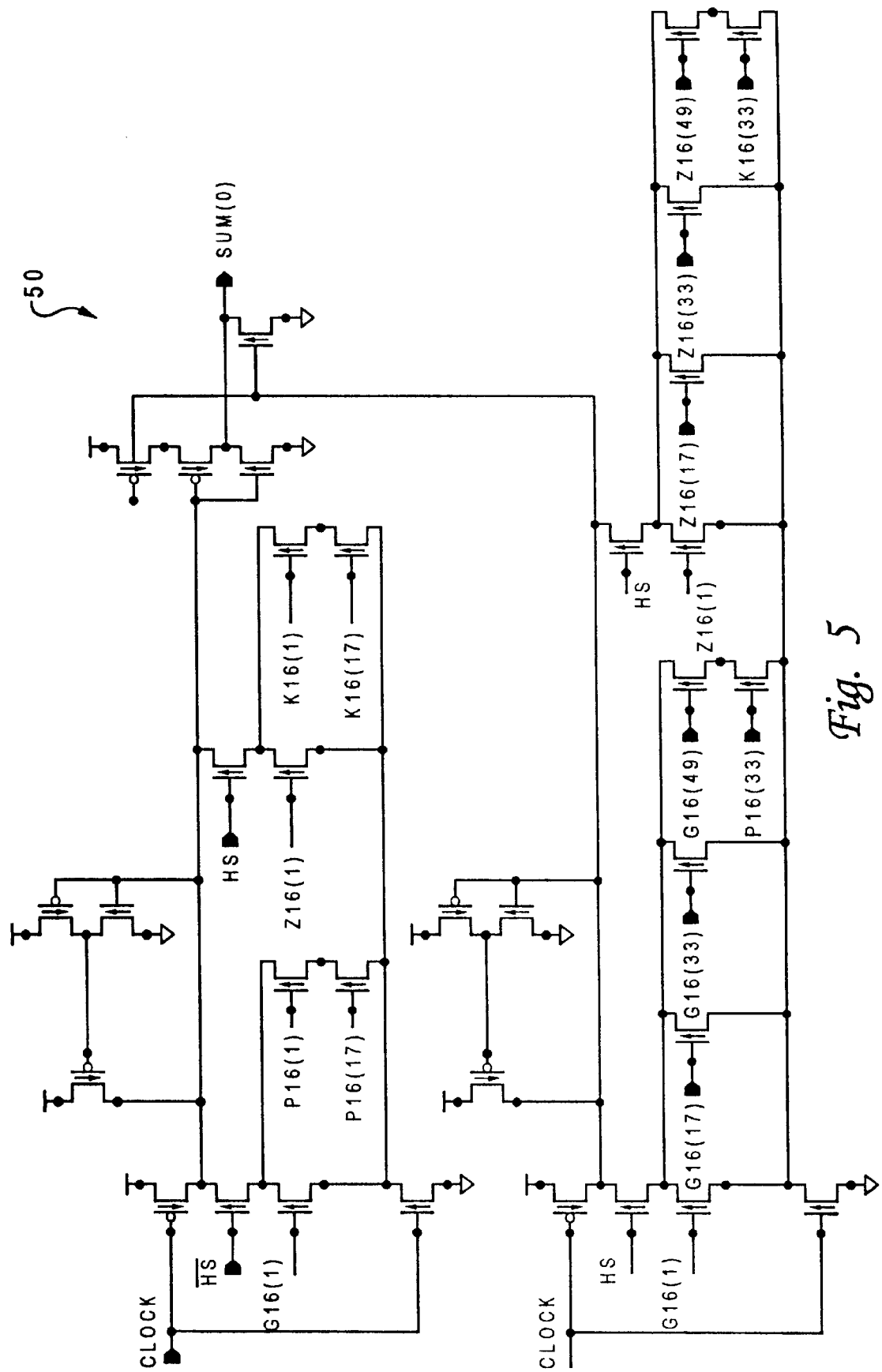
FIG. 5 is a schematic diagram of a circuit for generating a sum signal SUM(0), in accordance with a preferred embodiment of the present invention.

FIGS. 3 through 5 illustrate only a partial quantity of the bits of binary numbers A and B. However, it will be understood that the schematic diagrams depicted in these figures may be duplicated and utilized in a manner similar to that illustrated in order to generate the various necessary signals for the remaining quantity of bits.

Referring now to FIG. 3, there is depicted a schematic diagram of a circuit for generating a group generate signal G4(0) with bit locations A(0)–A(3) and B(0)–B(3), in accordance with a preferred embodiment of the present invention. Group generate circuit 30 is preferably included within Row 1 of FIG. 2. Those skilled in the art will recognize that group generate circuit 30 is only one implementation example of the G4(0) equation shown above. It is also understood that the circuits within Row 1 of FIG. 2 that generate other group generate G4 signals, such as G4(4), G4(8), and G4(16), are similar to group generate circuit 30.

A circuit for generating a group propagate P4(0) signal may be similar to group generate circuit 30. The only difference is that one of the inputs is P(3) instead of G(3), as noted in the P4(0) equation shown above.

With reference now to FIG. 4, there is depicted a schematic diagram of a circuit for generating a group generate signal G16(0), in accordance with a preferred embodiment of the present invention. Group generate signal G16(0) is produced utilizing group generate signals G4(0), G4(4), G4(8), G4(12) and group propagate signals P4(0), P4(4), P4(8). Group generate circuit 40 is preferably included within Row 2 of FIG. 2. Those skilled in the art will recognize that group generate circuit 40 is only one example of an implementation of the G16(0) equation shown above. It is also understood that the circuits within Row 2 of FIG. 2 that generate other group generate G16 signals, such as G16(16), G16(32), and G16(48), are similar to group generate circuit 40.

A circuit for generating a group propagate P16(0) signal may be similar to group generate circuit 40. The only difference is that one of the inputs is P4(12) instead of G4(12), as noted in the P16(0) equation shown above.

Referring now to FIG. 5, there is depicted a schematic diagram of a circuit for generating a sum signal SUM(0), in accordance with a preferred embodiment of the present invention. Sum circuit 50 is included within sum/carry module 22 of FIG. 2. Those skilled in the art will recognize that sum circuit 50 is only one implementation example of the SUM(0) equation shown above. Note that a stacking of only three transistors is required to generate any bit of the sum signals SUM(i).

Figure 6:
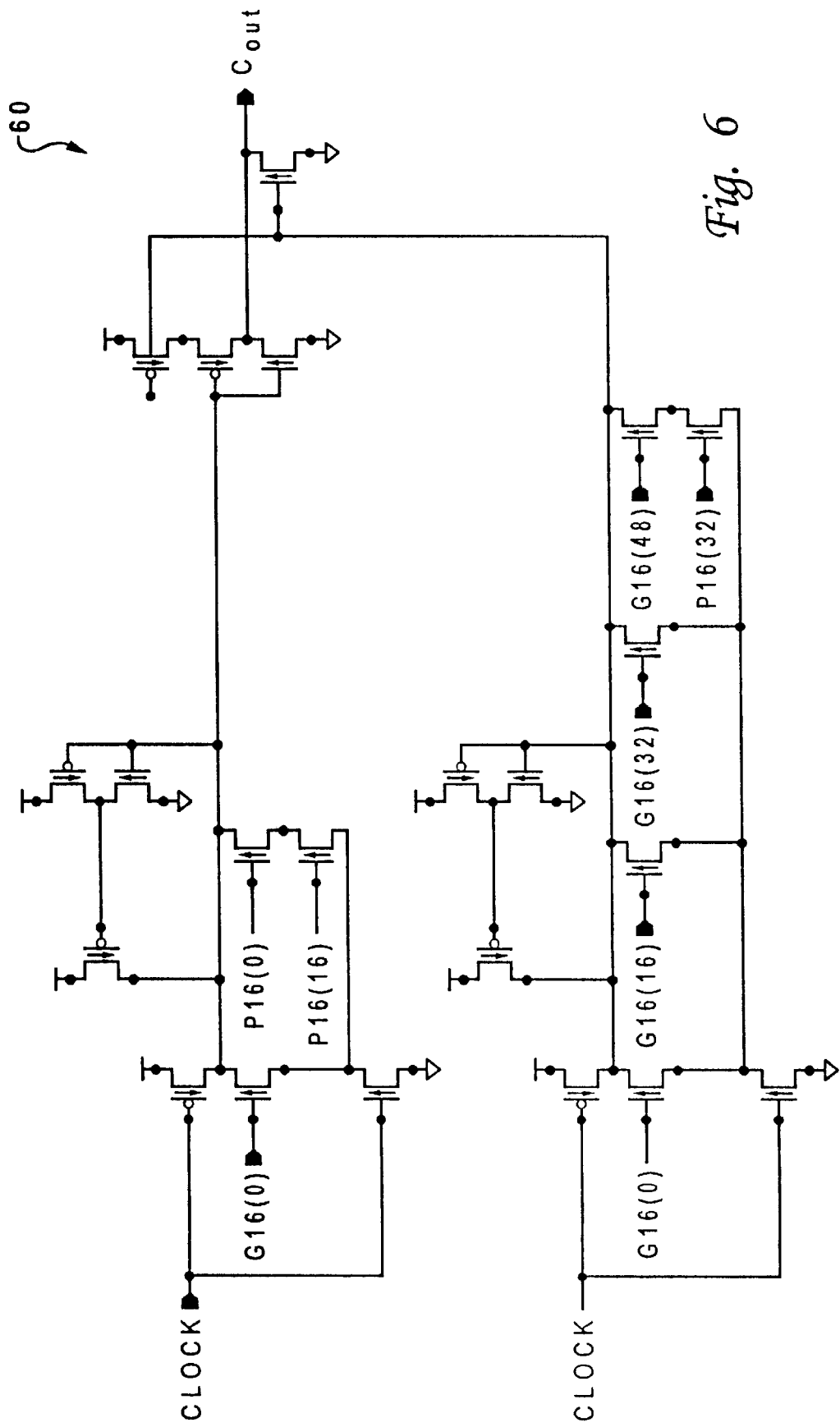
FIG. 6 is a schematic diagram of a circuit for generating a carry signal $C_{OUT}$, in accordance with a preferred embodiment of the present invention.

With reference now to FIG. 6, there is depicted a schematic diagram of a circuit for generating a carry signal $C_{OUT}$, in accordance with a preferred embodiment of the present invention. Carry circuit 60 is included within sum/carry module 22 of FIG. 2. Those skilled in the art will recognize that carry circuit 60 is only one implementation example of the $C_{OUT}$ equation shown above. Also note that a stacking of only three transistors is required to generate the carry signal $C_{OUT}$.

As has been described, the present invention provides an improved binary adder. According to the present invention, a group of four-bit generates and propagates can be generated in one row (or level) of carry-lookahead circuits. By reducing the number of rows of carry-lookahead circuits required, the performance of the carry-lookahead binary adder is greatly improved.

It is understood the carry-lookahead binary adder as described may be applicable in a variety of processing devices. These processing devices include but are not limited to complex instruction set computing (CISC) processors and reduced instruction set computing (RISC) processors. Such processors typically comprise at least one processing unit, one or more cache memories associated with each processing unit, and various control logic circuits as are well-known in the art.

While the invention has been particularly shown and described with reference to a preferred embodiment, it will be understood by those skilled in the art that various changes in form and detail may be made therein without departing from the spirit and scope of the invention.

What is claimed is:

1. A binary adder for adding a first multiple-bit addend to a second multiple-bit addend, said binary adder comprising:

a plurality of rows of carry-lookahead circuits, wherein a first row of said plurality of rows includes a plurality of four-bit group generate circuits and a plurality of four-bit group propagate circuits, wherein each of said four-bit group generate circuits logically combines bits from four different bit positions within said multiple-bit addends to generate a group generate signal, wherein each of said four-bit group propagate circuits logically combines bits from four different bit positions within said multiple-bit addends to generate a group propagate signal;

a half-sum module for generating a half-sum signal; and a sum/carry module coupled to said half-sum module and to said plurality of rows of carry-lookahead circuits, wherein said sum/carry module generates a sum signal and a carry signal utilizing said half-sum signal, said generate signals, and said propagate signals.

2. The binary adder according to claim 1, wherein said plurality of rows is two when each of said multiple-bit addends has 64 bits.

3. The binary adder according to claim 1, wherein a group generate signal G4(0) in said first row of said plurality of rows is defined by [G(0)+P(0) P(1)] [G(0)+G(1)+G(2)+P(2) G(3)].

4. The binary adder according to claim 1, wherein a group propagate signal P4(0) in said first row of said plurality of rows is defined by [G(0)+P(0) P(1)] [G(0)+G(1)+G(2)+P(2) P(3)].

5. The binary adder according to claim 1, wherein a group generate signal G16(0) in a second row of said plurality of rows is defined by [G4(0)+P4(0) P4(4)] [G4(0)+G4(4)+G4(8)+P4(8) G4(12)].

6. The binary adder according to claim 1, wherein a group propagate signal P16(0) in a second row of said plurality of rows is defined by [G4(0)+P4(0) P4(4)] [G4(0)+G4(4)+G4(8)+P4(8) P4(12)].

7. The binary adder according to claim 1, wherein said carry signal is defined by [G16(0)+P16(0) P16(16)] [G16(0)+G16(16)+G16(32)+P16(32) G16(48)].

8. The binary adder according to claim 1, wherein a sum signal SUM(0) is defined by HS(0)$\oplus$C(1).

9. The binary adder according to claim 8, wherein said sum signal SUM(0) is defined by HS(0) [Z16(1)+K16(1) K16(17)] [Z16(1)+Z16(17)+Z16(33)+K16(33) Z16(49)]+HS(0) [G16(1)+P16(1) P16(17)] [G16(1)+G16(17)+G16(33)+P16(33) G16 (49)].

10. A processing device, comprising:

a processing unit;

a memory associated with said processing unit; and a binary adder for adding a first multiple-bit addend to a second multiple-bit addend, said binary adder includes:

a plurality of rows of carry-lookahead circuits, wherein a first row of said plurality of rows includes a plurality of four-bit group generate circuits and a plurality of four-bit group propagate circuits, wherein each of said four-bit group generate circuits logically combines bits from four different bit positions within said multiple-bit addends to generate a group generate signal, wherein each of said four-bit group propagate circuits logically combines bits from four different bit positions within said multiple-bit addends to generate a group propagate signal;

a half-sum module for generating a half-sum signal; and a sum/carry module coupled between said half-sum module and said plurality of rows of carry-lookahead circuits, wherein said sum/carry module generates a sum signal and a carry signal by utilizing said half-sum signal, said generate signals, and said propagate signals.

11. The processing device according to claim 10, wherein said plurality of rows is two when each of said multiple-bit addends has 64 bits.

12. The processing device according to claim 10, wherein a group generate signal G4(0) in said first row of said plurality of rows is defined by [G(0)+P(0) P(1)] [G(0)+G(1)+G(2)+P(2) G(3)].

13. The processing device according to claim 10, wherein a group propagate signal P4(0) in said first row of said plurality of rows is defined by [G(0)+P(0) P(1)] [G(0)+G(1)+G(2)+P(2) P(3)].

14. The processing device according to claim 10, wherein a group generate signal G16(0) in a second row of said plurality of rows is defined by [G4(0)+P4(0) P4(4)] [G4(0)+G4(4)+G4(8)+P4(8) G4(12)].

15. The processing device according to claim 10, wherein a group propagate signal P16(0) in a second row of said plurality of rows is defined by [G4(0)+P4(0) P4(4)] [G4(0)+G4(4)+G4(8)+P4(8) P4(12)].

16. The processing device according to claim 10, wherein said carry signal is defined by [G16(0)+P16(0) P16(16)] [G16(0)+G16(16)+G16(32)+P16(32) G16(48)].

17. The processing device according to claim 10, wherein a sum signal SUM(0) is defined by HS(0)$\oplus$C(1).

18. The processing device according to claim 17, wherein said sum signal SUM(0) is defined by HS(0) [Z16(1)+K16(1) K16(17)] [Z16(1)+Z16(17)+Z16(33)+K16(33) Z16(49)]+HS(0) [G16(1)+P16(1) P16(17)] [G16(1)+G16(17)+G16(33)+P16(33) G16(49)].

\* \* \* \* \*